July 9, 1968  R. A. HALL  3,392,246

VIBRATION DETECTION DEVICE

Filed May 17, 1967

INVENTOR.
ROBERT A. HALL
BY
Brumbaugh, Free, Graves & Donohue
his ATTORNEYS

United States Patent Office 3,392,246
Patented July 9, 1968

3,392,246
VIBRATION DETECTION DEVICE
Robert A. Hall, Montclair, N.J., assignor to Guardian Industries, Inc., Springfield, N.J., a corporation of New Jersey
Filed May 17, 1967, Ser. No. 639,181
8 Claims. (Cl. 200—61.5)

ABSTRACT OF THE DISCLOSURE

A vibration detection device includes a pair of contacts which are normally closed but which are adapted to be opened by a pivotable lever upon the occurrence of vibration of a surface on which the vibration detection device is mounted. The pivotable lever is biased by a spring against a notch in a weighted flexible latching spring. The inertia of the weight tends to hold the latching notch relatively stationary notwithstanding vibration of the surface. When vibration frees the pivotable lever from the latching notch, the spring pivots the lever so that a portion thereof engages an arm on which one of the contacts is mounted and separates the contacts.

BACKGROUND OF THE INVENTION

1. Field of the invention

This invention relates to vibration detection devices and, in particular, to a novel and highly-improved vibration detection device the sensitivity of which is adjustable independently of the force with which first and second break contacts are normally pressed together. Means are provided for maintaining the device in such condition following actuation as to facilitate ready identification of the device as having been actuated, and a plurality of such devices is particularly adapted for arrangement in circuit with an alarm for purposes of burglary detection.

2. Description of the prior art

Vibration detectors are known and are used, for example, for burglary detection. In such use, vibration detectors are typically mounted on windows, doors, or walls and are designed to open momentarily normally-closed electrical contacts when vibration results from an attempt to break through the protected surface. Conventional vibration detectors have, however, a number of serious disadvantages. For example, they are typically prone to produce false or spurious alarms after installation, and their design is such that it is extremely difficult to locate the malfunctioning detector or detectors in a typical multi-detector burglar alarm installation.

One reason for the difficulty in detecting an improperly adjusted device is that the contacts opened by, for example, nearby vehicular traffic promptly close again after the passage of the disturbance so that inspection of the devices fails to reveal which of them actuated the alarm.

Another shortcoming of conventional devices is that the force with which the contacts are normally held together is a function of the adjustment of the sensitivity For a sensitive adjustment, a light force is necessary, which means that dry circuit phenomena including resistive oxides formed on the contact surfaces or heat and aging causing deformation of the base or mounting surface give rise in time to spurious actuation of the devices.

SUMMARY OF THE INVENTION

An object of the present invention is to remedy the shortcomings noted above. In particular, an object of the invention is to provide a rugged, simple, inexpensive, compact vibration detection device in which the relatively movable contacts are strongly held in their normal relative position irrespective of the sensitivity adjustment and which, once actuated, remain in a condition adapted to facilitate ready verification of the fact of actuation.

The foregoing and other objects are attained in accordance with the invention by the provision, in a vibration detection device for mounting on a surface to detect vibration thereof, of a pair of contacts relatively movable between closed and opened states, one of the contacts being mounted to move with the surface upon the occurrence of vibration thereof. Actuating means is mounted to move with the vibrating surface, and latching means is mounted to remain relatively stationary notwithstanding vibration of the surface. The latching means latches the actuating means in an inoperative position in the absence of vibration of the surface exceeding a predetermined intensity and releases the latching means upon the occurrence of vibration of the surface exceeding the predetermined intensity. The actuating means when so released reverses the state of the contacts and maintains the contacts in such reversed state until manually reset. Means is provided bearing with adjustable force against the latching means thereby to adjust the sensitivity of the device independently of the force with which the contacts are retained in their normal positions.

BRIEF DESCRIPTION OF THE DRAWING

An understanding of other aspects of the invention may be gained from a consideration of the following detailed description of representative embodiments of the invention and of the accompanying figures of the drawing, in which.

DESCRIPTION OF THE PREFERRED EMBODIMENTS

Figure 1:
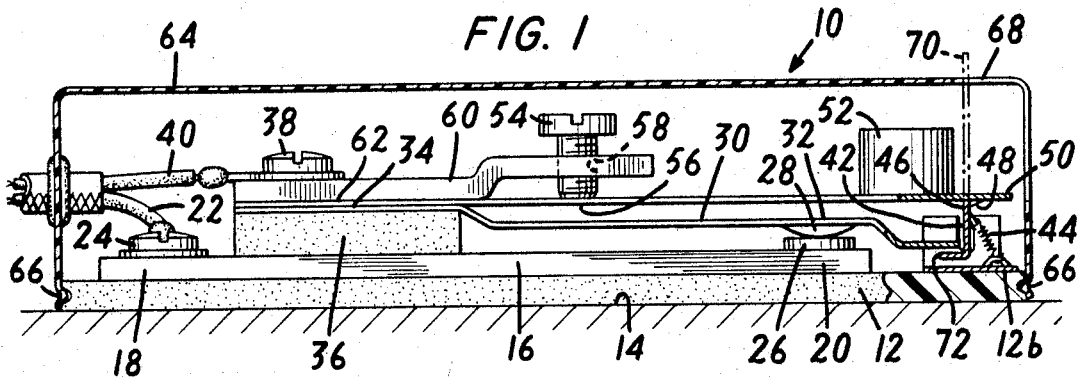
FIGURE 1 is a side elevational view, partly in section, of an exemplary embodiment of apparatus instructed in accordance with the invention.

FIG. 1 shows apparatus 10 constructed in accordance with the invention. The apparatus includes an insulating base 12 mounted on a surface 14 to be protected. The surface 14 is typically the surface of a wall, door, window, floor, or ceiling.

A first electrically conducting strip, which may be of brass, is mounted on the insulating base 12. The electrically conducting strip 16 has a terminal portion 18 and a contact portion 20. The terminal portion 18 is electrically connected to a lead 22 by a terminal screw 24. The contact portion 20 of the strip 16 is preferably formed with a contact 26 which is normally closed with a second contact 28.

The contact 28 is formed on a second electrically conducting member 30, which may also be of brass. The conducting member 30 is preferably a flexible spring mounted in cantilever fashion, the free end 32 accommodating the contact 28 and the other end 34 being supported by an insulating mounting 36 in insulated relation from the conducting strip 16 and serving as a second terminal portion.

A terminal screw 38 connects a second electrically conducting lead 40 to the portion 34 of the spring 30.

The contacts or contacting portions 26 and 28 are normally pressed firmly together so that minor heating or warping of the surface 14 or the formation of oxides on the contacts will not cause the generation of spurious signals. The spring 30 is not provided with a weight, as in typical conventional devices, so the contact 28 tends to follow the vibration of the surface 14 just as does the contact 26.

Actuation of the device to separate the contacts 26 and 28 is effected by a biased lever 42. The biased lever is pivotally mounted and biased by means such as a tension coil spring 44. The upper end 46 of the lever is normally retained by a notch 48 formed in a leaf spring 50. Those skilled in the art will readily understand that other retaining means can be employed in lieu of the notch 48. For example, the lever 42 could be provided with pins insertable within holes formed in the spring 50.

Figure 2:
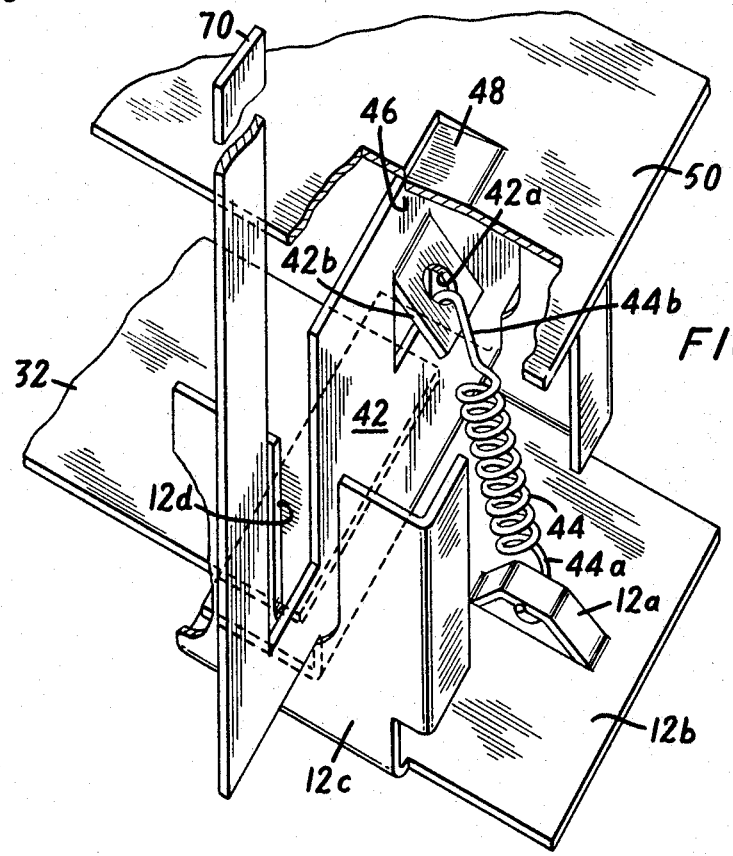
FIG. 2 is a fragmentary perspective view, on an enlarged scale, of the apparatus of FIG. 1.

As FIG. 2 best shows, the spring 44 is anchored at its lower end 44a in a boss 12a formed on a plate 12b securely attached to the base 12. At its upper end 44b, the spring 44 is secured through an eye 42a formed in a tab 42b on the lever 42. A wall portion 12c integral with the plate 12b is formed with a slot 12d permitting pivoting movement of the lever 42, as will hereinafter become evident.

The notched spring 50 tends to remain stationary notwithstanding vibration of the surface 14 because of the inertia of a weight 52 mounted thereon. The position and, if desired, the magnitude of the weight 52 are adjustable to adjust the sensitivity of the device. In addition, the sensitivity of the device is adjustable by a threaded screw 54 adapted to bear on the spring 50 at a point 56. The spring 50 is a flexible, and the force with which the screw 54 bears on the spring 50 adjusts the tendency of the notch 48 to follow downward movement of the lever 42 as seen in FIG. 1.

The adjustment screw 54 is mounted in a threaded aperture 58 formed in a spring retainer 60. The spring retainer 60 and the end 62 of the spring 50 are secured by the terminal screw 38 to the insulating mounting 36.

A dust cover 64, preferably formed of an insulating material, forms a snap-on engagement at 66 with the base 12 and protects the apparatus from dust.

The dust cover 64 is formed with a slot 68, and the lever 42 has a protruding portion 70 which extends exteriorly of the dust cover 64 to facilitate manual engagement for resetting the device after actuation. The protruding portion 70 of the lever 42 also facilitates ready verification of the fact that a device has been actuated and makes it possible to identify one or more vibration detection devices of a plurality of such devices arranged in circuit with an alarm which may be generating spurious alarm signals.

Figure 3:
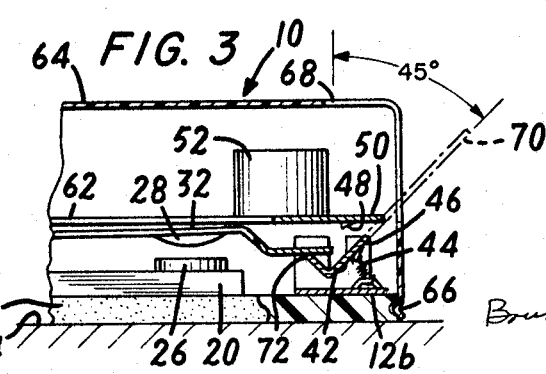
FIG. 3 is a fragmentary elevational view, on the same scale as FIG. 1, of the apparatus of FIG. 1 in an actuated condition.
Figure 4:
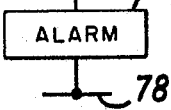
FIG. 4 is a schematic diagram of a plurality of devices according to FIGS. 1–3 in an alarm circuit.

Specifically, in operation, when the surface 14 and base 12 vibrate, the portion 46 of the lever 42 (see especially FIG. 2) engaging the notch 48 in the spring 50 will, if the intensity of the vibration exceeds a predetermined magnitude which is a function of the position and mass of the weight 52 and of the adjustment of the screw 54, move out of engagement with the notch 48, so that the spring 44 pivots the lever 42 clockwise as seen in FIG. 1 and the end 72 separates the contacts 26 and 28, as shown in FIG. 3.

Inasmuch as the lever 42 remains in the actuated condition shown in FIG. 3 until it is reset, the portion 70 extending at an angle of about 45° to the horizontal, the fact that the device has been actuated is readily determined upon visual inspection. Thus, a plurality of such devices A, B, C, and N may be arranged in circuit with an alarm 74 between leads 76 and 78. If experience shows that one of the devices is adjusted so that it repeatedly gives a spurious indication of an attack upon the protected surface, the device may be rendered less sensitive by adjustment of the screw 54. Any detector which has been actuated can be manually reset by manual engagement of the portion 70 of the lever 42 to move the lever 42 to a position normal to the base member 12.

Thus there is provided in accordance with the invention novel and highly-effective apparatus for the detection of vibration. The apparatus of the invention is rugged, simple, compact, and inexpensive to manufacture and repair. A relatively large contact force of, say 12 to 20 grams may be provided notwithstanding a very sensitive adjustment of the device.

Many modifications within the spirit and scope of the invention of the representative embodiments disclosed herein will occur to those skilled in the art. Accordingly, the invention is to be construed as including all of the embodiments thereof within the scope of the appended claims.

I claim:

1. A vibration detection device for mounting on a surface to detect vibration thereof, comprising a pair of contacts relatively movable between closed and open states and one of said contacts being mounted to move with said surface upon the occurrence of vibration thereof, actuating means mounted to move with said vibrating surface, latching means mounted to (a) remain relatively stationary notwithstanding vibration of said surface, (b) latch said actuating means in an inoperative position in the absence of vibration of said surface exceeding a predetermined intensity, and (c) release said actuating means upon the occurrence of vibration of said surface exceeding said predetermined intensity, said actuating means when so released reversing the state of said contacts, a dust cover enclosing said contacts, actuating means, and latching means, said dust cover being formed with a slot therein, said actuating means being mounted for pivotal movement to and from said inoperative position and having a portion extending through said slot to the exterior of said dust cover, said portion providing a visual indication by virtue of its position of whether said actuating means has been released by said latching means.

2. A vibration detection device according to claim 1 in which said portion is manually engageable for resetting said device.

3. A vibration detection device for mounting on a surface to detect vibration thereof, comprising the combination of first electrically conducting means having thereon a first terminal portion and a first contact portion in spaced-apart relation, second electrically conducting means having thereon a second terminal portion and a second contact portion in spaced-apart relation, said second electrically conductive means being flexible and mounted normally to press said second contact portion against said first contact portion and otherwise being in electrically insulated relation to said first electrically conducting means, actuating means mounted to move with said vibrating surface, a flexible latching member having a latching portion operatively associated with said actuating means and having a weight thereon to maintain said latching portion relatively stationary notwithstanding vibration of said surface, said latching portion latching said actuating means in an inoperative position in the absence of vibration of said surface exceeding a predetermined intensity and releasing said actuating means upon the occurrence of vibration of said surface exceeding said predetermined intensity, said actuating means when so released separating said contact portions.

4. A device as set forth in claim 3 in which said actuating means comprises a pivotable lever having a first portion and a second portion and biasing means connected to said lever for exerting a force thereon tending to pivot said lever, said first portion of said lever being normally restrained by said latching portion of said flexible latching member to prevent pivoting of said lever and being released upon the occurrence of vibration of said surface exceeding said predetermined intensity, said lever being pivoted by said biasing means upon release of said first portion of said lever to engage said second portion of said lever with said second electrically conducting means and separate said first and second contact portions.

5. A device as set forth in claim 3 further comprising means bearing with adjustable force against said flexible latching member thereby to adjust the sensitivity of said device independently of the force with which said second contact portion is normally pressed against said first contact portion.

6. A device as set forth in claim 3 in which said actuating means is manually engageable to reset said device after separation of said contact portions.

7. A device as set forth in claim 6 further comprising a dust cover for said device, said dust cover being formed with a slot therein and said actuating means comprising a lever formed with a protruding portion exteding through said slot to the outside of said dust cover, and said protruding portion being manually engageable to react said device after separation of said contact portions.

8. A device as set forth in claim 3 in which the position of said weight on said flexible latching member is adjustable thereby to adjust the sensitivity of said device independently of the force with which said second contact portion is normally pressed against said first contact portion.

References Cited

UNITED STATES PATENTS

| | | | |
|---|---|---|---|
| 2,311,545 | 2/1943 | Hurley | 200—61.45 |
| 2,698,886 | 1/1955 | Statham | 200—61.45 |
| 3,227,835 | 1/1966 | Conrath | 200—61.45 |

BERNARD A. GILHEANY, *Primary Examiner.*

H. BROOME, *Assistant Examiner.*